United States Patent [19]

Sasaki et al.

[11] Patent Number: 4,757,038

[45] Date of Patent: Jul. 12, 1988

[54] REGENERATION OF IRON-ANTIMONY METALLIC OXIDE CATALYSTS

[75] Inventors: Yutaka Sasaki; Yutaka Kiyomiya; Toshio Nakamura; Yoshimi Nakamura; Masanori Yamaguchi, all of Kanagawa, Japan

[73] Assignee: Nitto Chemical Industry Co., Ltd.

[21] Appl. No.: 52,226

[22] Filed: May 15, 1987

Related U.S. Application Data

[63] Continuation of Ser. No. 744,885, Jun. 14, 1985, abandoned, which is a continuation of Ser. No. 545,715, Oct. 26, 1983, abandoned.

[30] Foreign Application Priority Data

Oct. 26, 1982 [JP] Japan .................................. 57-186746

[51] Int. Cl.$^4$ .................. B01J 23/94; B01J 23/92; C07C 121/32; C07C 121/14
[52] U.S. Cl. .................................. 502/20; 423/376; 502/25; 502/34; 502/215; 558/321; 558/322; 558/323; 558/324; 558/325; 562/547; 568/479
[58] Field of Search ............... 502/20, 25, 34, 215; 562/545, 547; 568/431, 449, 474, 479; 585/622, 626, 901; 558/321–325

[56] References Cited

U.S. PATENT DOCUMENTS

| | | |
|---|---|---|
| Re. 30,430 | 11/1980 | Kerr .................................. 502/35 |
| 3,236,782 | 2/1966 | Koch .................................. 568/479 |
| 3,882,159 | 5/1975 | Callahan et al. ............... 260/465.3 |
| 4,029,636 | 6/1977 | Lowry et al. .................. 260/465.3 |
| 4,151,116 | 4/1979 | McDermott ..................... 502/209 |
| 4,391,880 | 7/1983 | Tsao .................................. 562/534 |
| 4,409,122 | 10/1983 | Klevskens et al. ................ 502/20 |
| 4,410,450 | 10/1983 | Sasaki et al. ..................... 502/215 |
| 4,536,483 | 8/1985 | Sasaki et al. ....................... 502/20 |
| 4,618,593 | 10/1986 | Sasaki et al. ....................... 502/20 |

FOREIGN PATENT DOCUMENTS

95391  3/1978  Poland .................................. 502/20

Primary Examiner—Paul E. Konopka
Attorney, Agent, or Firm—Sughrue, Mion, Zinn, Macpeak & Seas

[57] ABSTRACT

Iron-antimony metallic oxide catalysts which have become deactivated after being used for the production of aldehydes, acids, nitriles, or dienes through oxidation, ammoxidation, or oxidative dehydrogenation of organic compounds in fluidized-bed reactors are regenerated by adding to the catalyst a molybdenum-enriched catalyst formed by supporting a molybdenum component which is volatile or capable of forming a volatile compound under reaction conditions on a metallic oxide catalyst. The metallic oxide catalysts contain as essential components (I) Fe, (II) Sb, (III) at least one element selected from the group consisting of V, Mo and W, and (IV) Te.

13 Claims, No Drawings

REGENERATION OF IRON-ANTIMONY METALLIC OXIDE CATALYSTS

This is a continuation of application Ser. No. 744,885 filed June 14, 1985 now abandoned, which is a continuation of application Ser. No. 545,715 filed Oct. 26, 1983 now abandoned.

FIELD OF THE INVENTION

The present invention relates to a process for regenerating iron-antimony metallic oxide catalysts which have become deactivated after being used for oxidation, ammoxidation, or oxidative dehydrogenation of organic compounds in fluidized-bed reactors.

BACKGROUND OF THE INVENTION

It is known that iron-antimony metallic oxide catalysts containing an essential elements (I) iron, (II) antimony, (III) at least one element selected from the group consisting of vanadium, molybdenum and tungsten, and (IV) tellurium are useful for oxidation, ammoxidation or oxidative dehydrogenation of organic compounds.

Such catalysts are described in U.S. Pat. Nos. 3,668,147, 3,716,496, 3,988,359, 4,083,804 and 4,370,279, and Japanese Patent Publication Nos. 19766/72, 19767/72 and 39839/79, all of which were issued to the present inventors.

Such catalysts catalyze the oxidation of propylene into acrolein and acrylic acid, and the ammoxidation of propylene and acrylonitrile. They also catalyze the oxidation of isobutene and t-butanol into methacrolein and methacrylic acid and the ammoxidation of isobutene and t-butanol into methacrylonitrile.

Moreover, by the use of such catalysts, methanol is oxidized into formaldehyde and ammoxidized into hydrogen cyanide, and n-butene is oxidatively dehydrogenated into butadiene.

These iron-antimony metallic oxide catalysts have good activity and life (duration of selectivity), and exhibit outstanding catalytic performance. Nevertheless, they may become deactivated gradually when used over a long period of time, depending on the specific conditions of reaction. The deactivation may be accelerated by accidents or inappropriate reaction conditions.

There are a variety of causes for deactivation, and remedies for deactivation are being investigated from several aspects. The causes are not yet completely understood and the remedies proposed so far are limited to changing the reaction conditions, replacing the catalyst partially or entirely, and removing the deactivated catalyst from the reactor and regenerating it. Such remedies are time-consuming and costly because they interrupt the reaction. An example of these remedies is described in U.S. Pat. No. 4,208,303.

Any method of recovering the catalytic performance without interruption of the reaction would be very advantageous.

One such method is disclosed in U.S. Pat. No. 3,882,159. According to the disclosure, the deactivated molybdenum-containing catalyst for fluidized-bed reactors used for ammoxidation of hydrocarbons is regenerated by being contacted with fluidized-bed particles composed of a substantially inactive carrier and molybdenum oxide during the course of the reaction. The regeneration is accomplished by replenishing the catalyst with the molybdenum component, because it is stated that molybdenum is lost from the molybdenum-containing catalyst in the course of reaction and this decreases the catalytic activity.

This process, however, has certain disadvantages. The particles that replenish the deactivated catalyst with the molybdenum component are composed of a molybdenum component and an inert carrier. These particles release the molybdenum component, leaving only the inert carrier. The particles of the inert carrier have a low specific gravity, and mostly escape from the fluidized-bed reactor, but it is very difficult to remove them completely. The unremoved inert carrier particles (e.g., silica particles) accumulate in the fluidized-bed reactor and dilute the catalyst when the regeneration process is repeated, thus causing further problems in maintaining catalytic activity. For this reason, the regeneration process described can be used only for a limited period.

This U.S. patent is concerned only with regeneration of a molybdenum containing fluidized-bed catalyst, wherein molybdenum oxide supported on an inert carrier is used as the regenerating agent. The above-described U.S. patent does not disclose a process for regenerating an iron-antimony metallic oxide catalyst. Furthermore, because it teaches as essential the use of an inert carrier for the replenisher, the process has the disadvantage that unremoved inert carrier particles accumulate in the reactor, diluting the catalyst and reducing catalytic activity.

U.S. Pat. No. 3,236,782 discloses a process for regenerating metallic oxide catalysts, at least a part of which is chromium, vanadium, molybdenum or tungsten. According to the disclosure, the regeneration process is accomplished by contacting the catalyst with a vapor of the above-listed metal present in the catalyst. This regeneration process is intended to replenish the chromium, vanadium, molybdenum or tungsten component which has escaped in the course of reaction. This process, however, requires a complex operation to introduce into the reaction system fresh component in the vapor phase. Further, this U.S. patent does not disclose a process for the regeneration of an iron-antimony metallic oxide catalyst, and only discloses the process when used in a fixed-bed reactor.

SUMMARY OF THE INVENTION

This invention overcomes the above-described problems encountered in regenerating iron-antimony metallic oxide catalysts used in the oxidation, ammoxidation or oxidative dehydrogenation of organic compounds.

An object of this invention is to provide a process for regenerating iron-antimony metallic oxide catalysts which have become deactivated after being used for the production of aldehydes, acids, nitriles or dienes through oxidation, ammoxidation, or oxidative dehydrogenation of organic compounds in fluidized-bed reactors.

A further object of this invention is to provide a regeneration process that can be carried out in the course of the reaction without interruption of the reaction resulting in economic loss, and a process which does not require additional equipment for introducing the replenisher in the vapor phase.

These objects are achieved by performing the oxidation, ammoxidation or oxidative dehydrogenation reaction in the presence of both a metallic oxide catalyst and a molybdenum component which is volatile or capable of forming a volatile compound under reaction conditions. The metallic oxide catalyst contains as essential components (I) Fe, (II) Sb, (III) at least one element selected from the group consisting of V, Mo and W, and (IV) Te. The molybdenum-enriched component, which may be the same as or different from the metallic oxide catalyst, contains as essential ingredients (I) iron, (II) antimony, (III) molybdenum and (IV) tellurium. The molybdenum-enriched catalyst is produced by supporting a molybdenum component which is volatile or capable of forming a volatile compound under reaction conditions on the metallic oxide catalyst.

DETAILED DESCRIPTION OF THE INVENTION

Catalyst

The catalyst to be regenerated in this invention includes any of the iron-antimony metallic oxide catalysts for fluidized-bed reactors described in the above-mentioned patents, containing as essential components (I) iron, (II) antimony, (III) at least one element selected from the group consisting of vanadium, molybdenum and tungsten, and (IV) tellurium. Preferred catalysts have the empirical formula:

$Fe_{10}Sb_aMe_bTe_cQ_dO_e(SiO_2)_f$ where

Me is at least one element selected from the group consisting of V, Mo and W;

Q is at least one element selected from the group consisting of Li, Na, K, Rb, Cs, Be, Mg, Ca, Sr, Ba, Y, La, Ce, Th, U, Ti, Zr, Hf, Nb, Ta, Cr, Mn, Re, Ru, Os, Co, Rh, Ir, Ni, Pd, Pt, Cu, Ag, Zn, Cd, B, Al, Ga, In, Tl, Ge, Sn, Pb, P, As, Bi, S and Se;

$a=2$ to 100 (preferably 10 to 40), $b=0.01$ to 20 (preferably 0.1 to 5), $c=0.05$ to 10 (preferably 0.25 to 5), $d=0$ to 20 (preferably 0.5 to 6), $e=$ a number corresponding to the oxides formed by the above components, and $f=0$ to 200 (preferably 25 to 150).

The catalyst may be used in any form. For the best results when used in fluidized-bed reactors, the particle size should be 1 to 500 microns, and preferably 5 to 200 microns. The weight mean diameter (median) of the particles should be 20 to 120 microns. These catalysts may or may not be supported on a carrier such as silica, silica-alumina, alumina, titania, silica-titania, and zirconia.

The preparation of the iron-antimony metallic oxide catalyst to be regenerated in accordance with the process of this invention is not restricted to a specific process. For example, catalysts for fluidized-bed reactors may be produced by spray drying and other known methods as disclosed in U.S. Pat. Nos. 3,341,471, 3,657,155 and 3,686,138. In U.S. Pat. No. 3,657,155, the slurry containing a trivalent antimony compound, a polyvalent metal compound, silica sol, a ferric compound and a nitric acid radical is previously prepared, after adjusting the pH of the resulting slurry to 7 or less, it is subjected to a heat-treatment while retaining the form of slurry at a temperature of about 40° to 150° C. and then the slurry is finally spray-dried. Thereafter, the composition is calcined at a temperature of about 400° to 1,000° C. for 1 to 50 hours to produce the iron-antimony metallic oxide catalyst.

Molybdenum-Enriched Catalyst

The molybdenum-enriched catalyst used in the process of this invention is not unduly limited and may be freely selected from a variety of compounds. It is in the form of particles that can be fluidized under the reaction conditions, because in a preferred embodiment this invention is applied to regenerate the catalyst for a fluidized-bed reactor in the course of the reaction. In addition, the molybdenum element which is incorporated in the molybdenum-enriched catalyst should be volatile or capable of forming a volatile compound under the reaction conditions conventionally used in the reaction.

Typically, the molybdenum-enriched catalyst is an iron-antimony metallic oxide catalyst as described above, which is impregnated with an additional amount of molybdenum and serves as a support for the molybdenum.

The molybdenum-enriched catalyst may be produced by any method known in the art, such as the methods identified above for producing iron-antimony catalysts, followed by molybdenum-enrichment.

The catalyst to be enriched with molybdenum is preferably an iron-antimony metallic oxide catalyst containing as essential elements (I) iron, (II) antimony, (III) at least one element selected from the group consisting of vanadium, molybdenum and tungsten, and (IV) tellurium, and may be freshly prepared or may be a catalyst that has become deactivated by use.

The used or unused iron-antimony metallic oxide catalyst is impregnated with and acts as a support for the molybdenum compound. The method for impregnating the iron-antimony metallic oxide catalyst with the molybdenum compound is not limited, and may be freely selected from any of those known in the art as described in U.S. Pat. Nos. 4,049,575 and 4,374,758. By a typical method, the molybdenum compound is dissolved in water and the solution (in a quantity corresponding to the pore volume of the catalyst used as a support) is mixed with the catalyst. The impregnated catalyst is recovered and is then dried and calcined at a temperature of about 600° C. or less, preferably 150° to 600° C.

The following impregnation solutions are stable and preferred.

(1) Ammonium paramolybdate dissolved in water.

(2) Ammonium paramolybdate dissolved in hydrogen peroxide solution.

(3) Ammonium paramolybdate dissolved in organic amine aqueous solution.

(4) Phosphomolybdic acid dissolved in water.

(5) Molybdenum trioxide or molybdic acid dissolved in ammonia water.

These impregnation solutions are effective in increasing the concentration of molybdenum after treatment in solution. The above-mentioned operation may be repeated where the catalyst is to be impregnated with the molybdenum component at high concentrations.

After impregnation, the catalyst is dried. Usually, drying alone is enough; but the impregnated catalyst may be calcined. The calcination temperature is preferred to be about 600° C. or less, more preferably 150° to 600° C.; if the temperature is too high, the supported molybdenum component vaporizes or reacts with the iron-antimony metallic oxide catalyst to form nonvolatile compounds. This decreases the effective amount of molybdenum.

The thus-prepared molybdenum-enriched catalyst has a slightly higher particle density than the catalyst; but they are similar in particle size and can be mixed readily. Therefore, the regeneration step can be carried out effectively under fluidization in the course of a reaction.

The source of molybdenum which is applied to the support catalyst is not restricted, and may be any molybdenum source which is volatile or capable of forming a volatile compound under reaction conditions.

Examples of the molybdenum component used for the enrichment include molybdenum dioxide, molybdenum trioxide, molybdic acid, ammonium molybdate, ammonium paramolybdate, other molybdates, phosphomolybdic acid, ammonium phosphomolybdate, other phosphomolybdates, heteropoly acids of molybdenum and salts thereof, molybdenum disulfide, molybdenum trisulfide, molybdenum dichloride, molybdenum trichloride, molybdenum pentachloride, other solid molybdenum halides, and organic molybdenum compounds which are solid at ordinary temperature. Preferred compounds include molybdenum trioxide, molybdic acid, ammonium molybdate, ammonium paramolybdate and phosphomolybdic acid.

For best results when mixed with the catalyst, the molybdenum-enriched catalyst should have approximately the same particle diameter as that of the catalyst. The molybdenum-enriched catalyst has physical properties similar to those of the fluidized-bed catalyst for the intended reaction. Therefore, it can be handled in the same manner as the fluidized-bed catalyst.

Regeneration Process

According to the process of this invention, the regeneration of the catalyst can be accomplished without interrupting the reaction.

The molybdenum-enriched catalyst may be introduced into the fluidized-bed reactor during the reaction in the same manner that the fluidized-bed catalyst is introduced, or it may be introduced together with the catalyst after dry-blending.

The molybdenum-enriched catalyst used in this invention has physical properties, e.g, particle density and particle size distribution, similar to those of catalysts commonly used for fluidized-bed reactors. Therefore, the molybdenum-enriched catalyst is easily mixed with the catalyst in the course of the reaction, and the molybdenum component is easily transferred to the catalyst.

The molybdenum compound supported on the enriched catalyst is gradually volatized in the reaction system and deposits on the catalyst to be regenerated.

The molybdenum-enriched catalyst changes as the molybdenum component supported thereon is volatized in the reactor, and its properties gradually become similar to those of the supporting catalyst. It is desirable to use a small quantity of molybdenum-enriched catalyst containing as much molybdenum as possible.

In order for the molybdenum component to be used effectively, it should remain in the reactor for a period of time sufficient for it to transfer to the catalyst. This time period varies depending on the properties and shape of the molybdenum component; thus the quantity and rate of addition must be properly adjusted.

The catalyst is regenerated when the molybdenum component is transferred from the enriched catalyst to the deactivated catalyst. If the quantity of the molybdenum-enriched catalyst is excessively small, the effect is not produced; and if it is excessively great, carbon dioxide and carbon monoxide are formed and the yield decreases.

The molybdenum-enriched catalyst should be added in such an amount that the apparent content of molybdenum in the catalyst increases by 0.01 to 2 wt %, preferably 0.05 to 1.5 wt %, and most preferably 0.05 to 0.5 wt %. The increase in apparent content of molybdenum is defined as follows:

Increase of apparent molybdenum content (%) =

$$\frac{\text{Weight of molybdenum in molybdenum-enriched catalyst added (g)}}{\text{Total weight of catalyst (g)}} \times 100$$

The preferred quantity of the molybdenum-enriched catalyst to be added varies slightly depending on its properties. In the event that the molybdenum component is rapidly transferred to the depleted catalyst, the molybdenum-enriched catalyst is calculated as indicated above. In the event that the molybdenum component is more slowly transferred to the depleted catalyst, the molybdenum-enriched catalyst is used in somewhat greater quantity than calculated.

The molybdenum-enriched catalyst may be physically dry-blended with the catalyst before the reaction starts, or it may be added alone or together with the catalyst during the reaction. In the case of a fluidized-bed reaction, it is possible conveniently to add or withdraw the catalyst in the course of reaction as compared with the fixed-bed reaction.

The molybdenum-enriched catalyst can be handled in the same manner as the fluidized-bed catalyst, and it can be added and mixed in the course of reaction continuously or intermittently by a simple operation.

The molybdenum-enriched catalyst may be added in several portions according to the state of reaction.

If the yield obtained is not completely restored by the addition of the molybdenum-enriched catalyst, or if the yield is decreased by excessive addition of the molybdenum-enriched catalyst, it may be possible to restore the yield by adding the tellurium-containing solid disclosed in U.S. patent application Ser. No. 379,205 filed on May 17, 1982 by the present inventors.

The catalysts involved in the process of this invention are iron-antimony metallic oxide catalysts. Even in the case of catalysts of this kind which contain a small quantity of molybdenum component, the loss of the molybdenum component is not observed in the course of the reaction. Therefore, it is not likely that deactivation takes place due to the escape of molybdenum from the catalyst.

Furthermore, the catalyst does not necessarily contain molybdenum as an essential ingredient. Nevertheless, the activity of a catalyst is restored when a molybdenum component is added. This surprising result has never been anticipated.

It is theorized that the molybdenum component introduced into the fluidized-bed in the course of the reaction deposits evenly on the catalyst. This is one of the factors which make the process of this invention effective.

It is considered likely that the regeneration involved in this invention takes place according to a mechanism different from that described in the above-mentioned U.S. Pat. Nos. 3,882,159 and 3,236,782.

The mechanism by which the process of this invention produces its effect is not yet elucidated. It is considered probable, however, that the volatile molybdenum component formed under reaction conditions is deposited on the deactivated catalyst, resulting in the formation of new reaction sites. In other words, the process of this invention seemingly performs the regeneration of catalysts; but in essence, it creates new reaction sites on the catlyst.

Regeneration of the depleted catalyst occurs 1 to 5 hours after the addition of the molybdenum-enriched catalyst. The added molybdenum component is firmly fixed to the reactivated catalyst, and its effect is lasting. The molybdenum-enriched catalyst may be added to regenerate a catalyst on several successive occasions as required.

An important restriction in the present process is that the quantity of the molybdenum-enriched catalyst added is limited to a given range, and preferred results are not obtained when these limits are exceeded.

According to the process of this invention, the reaction rate can be increased and the yield for the intended product can be restored if the type and quantity of the molybdenum component are properly selected.

The oxidation, ammoxidation and oxidative dehydrogenation of organic compounds to which the process of this invention can be applied may be performed under any conventional conditions known in the art and are not restricted. That is, the molar ratio of organic compound : oxygen : ammonia is typically 1:0.5–10:0–5; the reaction temperature is typically 350° C. to 500° C.; and the reaction pressure is typically atmospheric pressure to 2 kg/cm$^2$G. The feed gas may be diluted with nitrogen, steam, carbon dioxide, carbon monoxide, or helium, in any conventional ratio.

The organic compound includes, for example, propylene, isobutene, n-butene, methanol, and t-butanol. These compounds form their corresponding aldehydes, acids, diolefins and nitriles.

The conditions for the fluidized-bed reaction are not limited and may be freely selected from those known in the art. The linear velocity ranges from the order of cm/sec to the order of m/sec, and is properly selected according to the scale and type of reactor used. In this specification, the yield and contact time are defined as follows:

$$\text{Yield (\%)} = \frac{\text{Weight of carbon in reaction product (g)}}{\text{Weight of carbon in organic compound fed (g)}} \times 100$$

$$\text{Contact time (sec)} = \frac{\text{Volume of filled catalyst (l)*}}{\text{Flow rate of feed gas (l/sec)}}$$

*based on the bulk density of catalyst

The present invention is illustrated in greater detail by reference to the following examples and comparative examples. However, this invention is not to be construed as being limited to those examples. Unless otherwise indicated herein, all parts, percentages, ratios and the like are by weight.

Catalytic activity was tested under the following conditions.

(1) Ammoxidation of propylene

A catalyst was charged into a fluidized-bed reactor having a catalyst fluidizing section of 2.5 cm inside diameter and 40 cm height, and feed gas of the following composition was introduced:

O$_2$ (air)/propylene = 2.2 (mol/mol)
NH$_3$/propylene = 1.1 (mol/mol) The reaction was carried out at atmospheric pressure.

(2) Ammoxidation of isobutene

The same reactor as used for ammoxidation of propylene was used, and feed gas of the following composition was introduced:

O$_2$ (air)/isobutene = 3.0 (mol/mol)
NH$_3$/isobutene = 1.3 (mol/mol) The reaction was carried out at atmospheric pressure.

(3) Ammoxidation of methanol

The same reactor as used for ammoxidation of propylene was used, and feed gas of the following composition was introduced:

O$_2$ (air)/methanol = 2.3 (mol/mol)
NH$_3$/methanol = 1.2 (mol/mol)
(4.0 vol % methanol)

The reaction was carried out at atmospheric pressure.

EXAMPLE 1

The ammoxidation of propylene was carried out using a fluidized-bed catalyst having an empirical formula of W$_{0.25}$Te$_{1.0}$Fe$_{10}$Sb$_{25}$O$_{67.8}$(SiO$_2$)$_{30}$.

When the activity of this catalyst was tested by charging the catalyst in a reactor and reacting according to test condition (1) set forth above, the initial yield of acrylonitrile was 80%.

The yield of acrylonitrile later declined to 77% in the course of the reaction.

To this deactivated catalyst was added a molybdenum-enriched catalyst (containing 4.49 wt % of molybdenum) in an amount of 3.34 wt % based on the catalyst.

200 g of degraded catalyst was impregnated with 50 ml of an aqueous solution containing 17.7 g of ammonium paramolybdate.

The degraded catalyst was then dried at 120° C. for 16 hours and calcined at 300° C. for 2 hours.

The impregnated, molybdenum-enriched catalyst was added to the reactor and the reaction was resumed under the conditions described above.

Three hours later, the yield of acrylontrile was restored to 80%.

EXAMPLE 2

The ammoxidation of propylene was carried out as described in Example 1. To the deactivated catalyst of Example 1 was added a molybdenum-enriched catalyst (containing 6.50 wt % molybdenum) in an amount of 2.31 wt % based on the catalyst.

200 g of degraded catalyst was impregnated with 50 ml of 5% hydrogen peroxide water solution containing 26.5 g of ammonium paramolybdate.

The degraded catalyst was impregnated in this solution, and was then dried at 120° C. for 16 hours and calcined at 300° C. for 2 hours. The impregnated molybdenum-enriched catalyst thus obtained was added to the reactor and the reaction was resumed under the conditions described above.

Three hours later, the yield of acrylonitrile was restored to 80%.

EXAMPLE 3

The ammoxidation of propylene was carried out as in Example 1. To the degraded catalyst obtained in Example 1 was added a molybdenum-enriched catalyst (containing 8.44% of molybdenum) in an amount of 1.78 wt % based on the catalyst.

200 g of this degraded catalyst was impregnated with 50 ml of aqueous solution of phosphomolybdic acid (containing 40 wt % of $MoO_3$). The degraded catalyst was impreganted in the above solution, and was then dried at 120° C. for 16 hours and calcined at 400° C. for 1 hour.

The impregnated, molybdenum-enriched catalyst was added to the reactor and the reaction was resumed under the conditions described above.

Three hours later, the yield of acrylonitrile had increased to 79%.

EXAMPLE 4

The ammoxidation of propylene was carried out in a reactor using a fluidized-bed catalyst of empirical formula $V_{0.1}Mo_{0.5}W_{0.3}Te_{2.3}Cu_{3.0}Fe_{10}Sb_{20}O_{65.3}(SiO_2)_{100}$.

When the activity of this catalyst was tested by charging the catalyst in a reactor and reacting according to the test conditions set forth in (1) above, the initial yield of acrylonitrile was 82%. In the course of the reaction, the amount of feed air was temporarily reduced and was then restored to the initial flow rate. The yield of acrylonitrile declined to 79%.

The composition of the deactivated catalyst was determined by X-ray fluorescence analysis, and no loss of molybdenum was detected.

To this deactivated catalyst was added a separately prepared molybdenum-enriched catalyst (containing 6.48 wt % of molybdenum) in an amount of 4.63 wt % based on the catalyst.

200 g of fresh catalyst thus-prepared was impregnated with 70 ml of an aqueous solution containing 26.4 g of ammonium paramolybdate. The fresh catalyst was impregnated and was then dried at 120° C. for 16 hours.

200 g of the thus-dried molybdenum-enriched catalyst was added to the reactor and the reaction was resumed under the conditions described above. Three hours later, the yield of acrylonitrile had increased to 81%.

EXAMPLE 5

The ammoxidation of isobutene was carried out using a fluidized-bed catalyst of empirical formula $V_{0.1}W_{0.6}Te_{1.5}Zn_2Fe_{10}Sb_{20}O_{62.1}(SiO_2)_{60}$.

When the activity of this catalyst was tested by charging the catalyst in a reactor and reacting according to test condition (2) set forth above, the initial yield of methacrylonitrile was 68%.

After 50 hours of reaction, the yield of methacrylonitrile declined to 66%.

To this deactivated catalyst was added a molybdenum-enriched catalyst (containing 5.0 wt % molybdenum) in an amount of 10 wt% based on the catalyst. The molybdenum-enriched catalyst was prepared in the same was as in Example 1. The impregnated, molybdenum-enriched catalyst was added to the reactor and the reaction was resumed under the conditions described above. Four hours later, the yield of methacrylonitrile increased to 70%.

EXAMPLE 6

The ammoxidation of methanol was carried out using a fluidized-bed catalyst of empirical formula $W_{0.25}Te_{1.0}Fe_{10}Sb_{25}O_{67.8}(SiO_2)_{60}$.

When the activity of this catalyst was tested by charging the catalyst in a reactor and reacting according to test condition (3) set forth above, the initial yield of hydrogen cyanide was 85%.

After 50 hours of reaction, the yield of hydrogen cyanide was 79%. To this deactivated catalyst was added a molybdenum-enriched catalyst (containing 7.09 wt % of molybdenum) in an amount of 11.3 wt % based on the catalyst.

200 g of this unused catalyst was impregnated with 60 ml of aqueous solution containing 29.2 g of ammonium paramolybdate dissolved in 5% hydrogen peroxide water solution. The fresh catalyst was impregnated, and was then dried at 120° C. for 16 hours and calcined at 250° C. for 2 hours.

The impregnated, molybdenum-enriched catalyst thus prepared was added to the reactor and the reaction was resumed under the conditions described above.

Five hours later, the yield of hydrogen cyanide was increased to 83%.

The results of the above Examples are summarized in the following tables.

TABLE

| | | Molybdenum-Enriched Catalyst | | Results of Activity Tests | | | | |
|---|---|---|---|---|---|---|---|---|
| | Catalyst Composition (atomic ratio) | Apparent Increase of Mo (%) | Molybdenum Compound for Impregnation | Molybdenum Content (%) | Reaction Temperature (°C.) | Contact Time (sec) | Yield of Acrylonitrile (%) | Conversion of Propylene (%) |
| Example 1 | $W_{0.25}Te_{1.0}Fe_{10}Sb_{25}O_{67.8}$—$(SiO_2)_{30}$ | | | | | | | |
| | Before deactivation | | | | 460 | 6 | 80 | 99 |
| | After deactivation | | | | 460 | 6 | 77 | 96 |
| | After regeneration | 0.15 | Ammonium paramolybdate (in water) | 4.49 | 460 | 6 | 80 | 100 |
| Example 2 | After regeneration | 0.15 | Ammonium paramolybdate (in aq. $H_2O_2$) | 6.50 | 460 | 6 | 80 | 99 |
| Example 3 | After regeneration | 0.15 | Phosphomolybdic acid (in water) | 8.44 | 460 | 6 | 79 | 98 |
| Example | $V_{0.1}Mo_{0.5}W_{0.3}Te_{2.3}Cu_{3.0}$— | | | | | | | |

TABLE-continued

| | Catalyst Composition (atomic ratio) | Apparent Increase of Mo (%) | Molybdenum Compound for Impregnation | Molybdenum Content (%) | Reaction Temperature (°C.) | Contact Time (sec) | Yield (%) | Conversion (%) |
|---|---|---|---|---|---|---|---|---|
| 4 | Fe$_{10}$Sb$_{20}$O$_{65.3}$(SiO$_2$)$_{100}$ | | | | | | | |
| | Before deactivation | | | | 440 | 5 | 82 | 98 |
| | After deactivation | | | | 440 | 5 | 78 | 97 |
| | After regeneration | 0.3 | Ammonium paramolybdate (in water) | 6.48 | 440 | 5 | 81 | 98 |

| | | Molybdenum-Enriched Catalyst | | Results of Activity Tests | | | | |
|---|---|---|---|---|---|---|---|---|
| | Catalyst Composition (atomic ratio) | Apparent Increase of Mo (%) | Molybdenum Compound for Impregnation | Molybdenum Content (%) | Reaction Temperature (°C.) | Contact Time (sec) | Yield of Methacrylonitrile (%) | Conversion of Isobutene (%) |
| Example 5 | V$_{0.1}$W$_{0.6}$Te$_{1.5}$Zn$_2$Fe$_{10}$—Sb$_{20}$O$_{62.1}$(SiO$_2$)$_{60}$ | | | | | | | |
| | Before deactivation | | | | 420 | 2 | 68 | 98 |
| | After deactivation | | | | 420 | 2 | 66 | 96 |
| | After regeneration | 0.5 | Ammonium paramolybdate (in water) | 5.0 | 420 | 2 | 70 | 98 |

| | | Molybdenum-Enriched Catalyst | | Results of Activity Tests | | | | |
|---|---|---|---|---|---|---|---|---|
| | Catalyst Composition (atomic ratio) | Apparent Increase of Mo (%) | Molybdenum Compound for Impregnation | Molybdenum Content (%) | Reaction Temperature (°C.) | Contact Time (sec) | Yield of Hydrogen Cyanide (%) | Conversion of Methanol (%) |
| Example 6 | W$_{0.25}$Te$_{1.0}$Fe$_{10}$Sb$_{25}$—O$_{67.8}$(SiO$_2$)$_{60}$ | | | | | | | |
| | Before deactivation | | | | 430 | 1.5 | 85 | 98 |
| | After deactivation | | | | 430 | 1.5 | 79 | 94 |
| | After regeneration | 0.8 | Ammonium paramolybdate (in aq. H$_2$O$_2$) | 7.09 | 430 | 1.5 | 83 | 97 |

While the invention has been described in detail and with reference to specific embodiments thereof, it will be apparent to one skilled in the art that various changes and modifications can be made therein without departing from the spirit and scope thereof.

What is claimed is:

1. A process for regenerating an iron-antimony metallic oxide catalyst which has become deactivated by being used for ammoxidation of organic compounds to the corresponding nitriles in fluidized bed reactors, said process comprising the steps of:

providing a first iron-antimony metallic oxide catalyst containing as essential components (I) Fe, (II) Sb, (III) at least one element selected from the group consisting of V, Mo and W, and (IV) Te, which is deactivated, wherein said first catalyst prior to deactivation has the empirical formula:

Fe$_{10}$Sb$_a$Me$_b$Te$_c$Q$_d$O$_e$(SiO$_2$)$_f$ where
Me is at least one element selected from the group consisting of V, Mo and W;
Q is at least one element selected from the group consisting of Li, Na, K, Rb, Cs, Be, Mg, Ca, Sr, Ba, Y, La, Ce, Th, U, Ti, Zr, Hf, Nb, Ta, Cr, Mn, Re, Ru, Os, Co, Rh, Ir, Ni, Pd, Pt, Cu, Ag, Zn, Cd, B, Al, Ga, In, Tl, Ge, Sn, Pb, P, As, Bi, S and Se;
a is 2 to 100,
b is 0.01 to 20,
c is 0.05 to 10,
d is 0 to 20,
e is the number of oxygen atoms corresponding to the oxides formed by the above components, and
f is 0 to 200;

providing a second iron-antimony metallic oxide catalyst containing as essential components (I) Fe, (II) Sb, (III) at least one element selected from the group consisting of V, Mo and W, and (IV) Te, wherein said second catalyst prior to enrichment has the empirical formula;

Fe$_{10}$Sb$_a$Me$_b$Te$_c$Q$_d$O$_e$(SiO$_2$)$_f$ where
Me is at least one element selected from the group consisting of V, Mo and W;
Q is at least one element selected from the group consisting of Li, Na, K, Rb, Cs, Be, Mg, Ca, Sr, Ba, Y, La, Ce, Th, U, Ti, Zr, Hf, Nb, Ta, Cr, Mn, Re, Ru, Os, Co, Rh, Ir, Ni, Pd, Pt, Cu, Ag, Zn, Cd, B, Al, Ga, In, Tl, Ge, Sn, Pb, P, As, Bi, S and Se;
a is 2 to 100,
b is 0.01 to 20,
c is 0.05 to 20,
d is 0 to 20,
e is the number of oxygen atoms corresponding to the oxides formed by the above components, and
f is 0 to 200;

supporting a molybdenum compound which is volatile or capable of forming a volatile component under reaction conditions on said second catalyst by impregnating said second catalyst with said molybdenum compound thereby forming a molybdenum-enriched catalyst, wherein the molybdenum compound that is supported on the molybdenum-enriched catalyst is at least one member selected from the group consisting of molybdenum dioxide, molybdenum trioxide, molybdic acid, ammonium molybdate, ammonium paramolybdate, molybdates, phosphomolybdic acid, ammonium phosphomolybdate, phosphomolybdates, heteropoly acids of molybdenum and salts thereof, molybdenum dichloride, molybdenum trichloride and said molybdenum compound does not contain tellurium; and performing the ammoxidation of at least one organic compound in a fluidized bed reactor in the presence of a mixture of said first catalyst and said molybdenum-enriched catalyst, wherein the second iron-antimony metallic oxide catalyst is added to increase the apparent content of molybdenum in the total catalyst in the fluidized bed reactor by 0.01 to 2 wt %.

2. The process according to claim 1, wherein the first iron-antimony metallic oxide catalyst is a metal oxide catalyst containing, in addition to said components (I) to (IV), (V) at least one element selected from the group consisting of lithium, sodium, potassium, rubidium, cesium, beryllium, magnesium, calcium, strontium, barium, yttrium, lanthanum, cerium, thorium, uranium, titanium, zirconium, hafnium, niobium, tantalum, chromium, manganese, rhenium, ruthenium, osmium, cobalt, rhodium, iridium, nickel, palladium, platinum, copper, silver, zinc, cadmium, boron, aluminum, gallium, indium, thallium, germanium, tin, lead, phosphorus, arsenic, bismuth, sulfur, and selenium.

3. The process according to claim 1, wherein a is 10 to 40, b is 0.1 to 5, c is 0.25 to 5, d is 0.5 to 6, and f is 25 to 150.

4. The process according to claim 1, wherein a is 10 to 40, b is 0.1 to 5, c is 0.25 to 5, d is 0.5 to 6, and f is 25 to 150.

5. The process according to claim 1, wherein the molybdenum compound is at least one member of the group consisting of molybdenum trioxide, molybdic acid, ammonium molybdate, ammonium paramolybdate, or phosphomolybdic acid.

6. The process according to claim 1, wherein the first catalyst and the molybdenum-enriched catalyst each is in the form of particles having a diameter of 1 to 500 microns.

7. The process according to claim 1, wherein the first catalyst and the molybdenum-enriched catalyst each is in the form of particles having a weight mean diameter (median) of 20 to 120 microns.

8. The process according to claim 1, wherein a sufficient amount of molybdenum-enriched catalyst is added to increase the apparent content of molybdenum in the total catalyst in the fluidized-bed reactor by 0.01 to 2 wt %.

9. The process according to claim 1, wherein the first catalyst and the second catalyst have substantially the same empirical formula.

10. The process according to claim 1, wherein the first catalyst and the second catalyst have substantially different empirical formulae.

11. The process according to claim 1, wherein the molybdenum-enriched catalyst is prepared by impregnating the metallic oxides catalyst for fluidized-bed reactors with a molybdenum-containing solution prepared by any one of the following methods, followed by drying or followed by drying and subsequently calcining at a temperature of about 600° C. or less:
 (i) Dissolving ammonium paramolybdate in water
 (ii) Dissolving ammonium paramolybdate in hydrogen peroxide water solution
 (iii) Dissolving ammonium paramolybdate in an organic amine solution
 (iv) Dissolving phosphomolybdic acid in water
 (v) Dissolving molybdenum trioxide in ammonia water.

12. The process according to claim 1, wherein the second iron-antimony metallic oxide catalyst is added to increase the apparent content of molybdenum in the total catalyst in the fluidized bed reactor by 0.05 to 1.5 wt %.

13. The process according to claim 1, wherein the second iron-antimony metallic oxide catalyst is added to increase the apparent content of molybdenum in the total catalyst in the fluidized bed reactor by 0.05 to 0.5 wt %.

* * * * *